United States Patent
Patil (10) Patent No.: US 8,453,205 B1
(45) Date of Patent: May 28, 2013

(54) SECURE NETWORK SERVICES VIA DAEMONS

(75) Inventor: Prakash G. Patil, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1138 days.

(21) Appl. No.: 11/763,832

(22) Filed: Jun. 15, 2007

(51) Int. Cl.
*H04L 29/06* (2006.01)

(52) U.S. Cl.
USPC .............................. 726/2; 713/151; 380/279

(58) Field of Classification Search
USPC ............................ 713/151; 380/279; 709/224
See application file for complete search history.

(56) References Cited

U.S. PATENT DOCUMENTS

| | | | | |
|---|---|---|---|---|
| 6,198,824 | B1 * | 3/2001 | Shambroom | 380/279 |
| 7,027,412 | B2 * | 4/2006 | Miyamoto et al. | 370/255 |
| 7,124,183 | B2 * | 10/2006 | Pekary et al. | 709/224 |
| 7,240,191 | B2 * | 7/2007 | Robinson | 713/151 |
| 7,710,984 | B2 * | 5/2010 | Dunk | 370/400 |

* cited by examiner

*Primary Examiner* — Brandon Hoffman
*Assistant Examiner* — Michael D Anderson
(74) *Attorney, Agent, or Firm* — Harrity & Harrity, LLP

(57) ABSTRACT

A system receives a request from a requestor for a service performed by a network device, establishes an encrypted session with the requestor, and utilizes a temporary process to determine whether the requestor is authorized for the service. If the requestor is authorized, the system redirects the service request to the service, and provides the service to the requestor.

20 Claims, 5 Drawing Sheets

FIG. 5

SECURE NETWORK SERVICES VIA DAEMONS

BACKGROUND

The Internet may include public and private networks. To send private data over a public network may require encryption of the data, especially if the private data is sensitive and/or can be modified or forged during transit. Network devices, such as routers, receive data on physical media, such as optical fiber, analyze the data to determine its destination, and output the data on physical media in accordance with the destination. For example, the network devices may provide network services and may verify that the correct users obtain access to certain network services. Thus, authentication, encryption, and data integrity may often be important for network services. The network devices may utilize a network protocol (e.g., a Secure Shell (SSH) transport protocol) to provide such features. Unfortunately, the SSH transport protocol can not be used for daemon-based network services.

SUMMARY

According to one aspect, a method may include receiving a request from a requestor for a service performed by a network device, establishing an encrypted session with the requestor, and utilizing a temporary process to determine whether the requestor is authorized for the service. If the requestor is authorized, the method may include redirecting the service request to the service, and providing the service to the requestor.

According to another aspect, a system may include means for receiving a request from a requestor for a service performed by a network device, means for establishing an encrypted session with the requestor, means for utilizing a temporary process to determine whether the requestor is authorized for the service, means for redirecting, if the requestor is authorized, the service request to the service, and means for providing, if the requestor is authorized, the service to the requestor.

According to yet another aspect, a device may include processing logic configured to receive a request from a requestor for a service performed by the device, establish an encrypted session with the requestor, and utilize a temporary process to determine whether the requestor is authorized for the service. The processing logic may also redirect the service request to the service and may provide the service to the requestor if the requestor is authorized.

According to a further aspect, a device may include a memory storing instructions, and a processor executing the instructions to receive a request from a requestor for a service daemon performed by the device, and to initiate a protocol daemon, in response to receipt of the service daemon request. The protocol daemon may establish an encrypted session with the requestor, and initiate a temporary process that determines whether the requestor is authorized for the service daemon. The protocol daemon may redirect the service request to the service daemon and may provide the service daemon to the requestor if the requestor is authorized.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Systems and methods described herein may provide a mechanism that prevents multiple copies of a service from being created by a network device. For example, in one implementation, a protocol daemon of the network device may receive a service request and may authenticate a requestor of the service (e.g., a network client). If the service requestor is authenticated, a temporary relay process of the network device may perform an authorization check to determine whether to allow or deny access to the requested service, and may redirect the service request from the protocol daemon to a service daemon if the service is authorized. The temporary relay process may cease operation after redirecting the service request, which may conserve network device resources. The service daemon may provide the requested service to the requestor. Systems and methods described herein may provide security for any service requested from a network device, may be applied to a variety of network protocols, may be applied to any network device daemon, and may be scalable (e.g., new services may be added). Furthermore, the systems and methods may be implemented without altering the protocol daemon.

Exemplary Network

Figure 1:
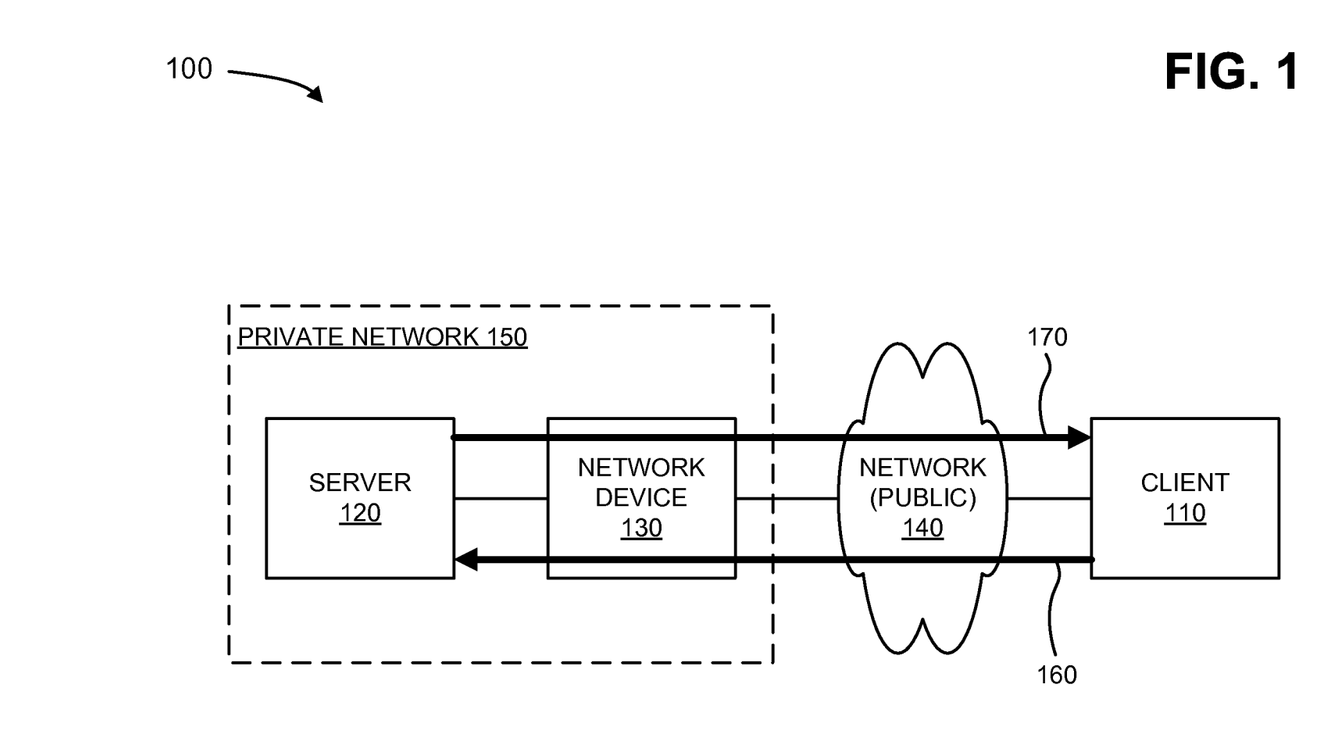
FIG. 1 is a diagram illustrating an exemplary network in which systems and methods described herein may be implemented.

FIG. 1 is an exemplary diagram of a network 100 in which systems and methods described herein may be implemented. Network 100 may include a client 110, a server 120, a network device 130, and a public network 140. A single client 110, server 120, and network device 130 have been illustrated in FIG. 1 for simplicity. In practice, there may be more clients 110, servers 120, and/or network devices 130. Also, in some instances, client 110 may perform a function of server 120 and/or server 120 may perform a function of client 110.

As shown in FIG. 1, client 110 may connect to a private network 150, which may contain server 120 and network device 130, via public network 140. Private network 150 may include a local area network (LAN), a private network, such as a company intranet, or another type of network. Private network 150 may also include organizational components, devices, servers, etc. (not shown in FIG. 1). Public network 140 may include a local area network (LAN), a wide area network (WAN), a metropolitan area network (MAN), a telephone network, such as the Public Switched Telephone Network (PSTN), the Internet, an intranet, other networks, or a combination of networks.

Client 110 and/or server 120 may each include a device, such as a personal computer, a wireless telephone, a personal digital assistant (PDA), a laptop, or another type of computation or communication device, a thread or process running on one of these devices, and/or an object executable by one of these devices. In one implementation, client 110 and/or server 120 may take the form of a provider of network content, such as a file, a web page, an email, an instant message, a document, etc. Server 120 may include a server, or a set of servers, that contain information, e.g., network content.

Network device 130 may include a data transfer device, such as a gateway, a router, a switch, a firewall, a bridge, a proxy server, a device providing an instant virtual extranet (IVE), a device providing a secure sockets layer (SSL) virtual private network (VPN), or some other type of device that processes and/or transfers data. SSL may provide endpoint authentication and communications privacy over a public network using cryptography. In one implementation, network device 130 may operate on data on behalf of an organizational network, such as private network 150. For example, network device 130 may receive all, or substantially all, data destined for private network 150 and/or transmitted by private network 150.

In one example, network device 130 may utilize a secure VPN (e.g., SSL VPN) to provide a service(s) (e.g., providing access to a document) to a client (e.g., client 110) requesting such a service(s). The secure VPN may use cryptographic protocols to provide necessary confidentiality (e.g., preventing hackers), client authentication (e.g., preventing identity spoofing), and message integrity (preventing message alteration) to achieve the privacy intended for the document(s) and/or service(s) by private network 150. The secure VPN may provide secure communications for the document(s) and/or service(s) over unsecured networks (e.g., public network 140).

A "document," as the term is used herein, is to be broadly interpreted to include any machine-readable and machine-storable work product. A document may include, for example, an application, a program, flash content, an email, a portion of an email, a series of emails, an instant message, a portion of an instant message, a series of instant messages, a file, a portion of a file, a combination of files, one or more files with embedded links to other files, a web site, combinations of any of the aforementioned, etc. Documents often include textual information and may include embedded information (such as meta information, images, hyperlinks, etc.) and/or embedded instructions (such as Javascript, etc.).

Network device 130 may perform one or more operations or services if a service request 160 is provided by client 110. For example, in one implementation, network device 130 may receive service request 160, and may provide authentication of client 110 for access to network device 130 and/or private network 150. If client 110 is authenticated, network device 130 may determine whether client 110 is authorized for access to the services specified by service request 160. If client 110 is authorized for access to the services, network device 130 may provide the service request to server 120. However, instead of providing the service directly from server 120 to client 110, a response 170 providing the service may be redirected to network device 130. Network device 130 may provide secure communication (e.g., encryption) of response 170 to client 110.

Network device 130 may be capable of utilizing a variety of protocols. In one example, network device 130 may utilize a Secure Shell (SSH) transport protocol and may utilize other protocols (e.g., SSH File Transfer Protocol (SFTP), Digital Transmission Content Protection (DTCP), Secure Copy Protocol (SCP), etc.) in conjunction with the SSH protocol. SSH may include a network protocol that permits establishment of a secure channel between devices, e.g., between client 110 and network device 130. The SSH protocol may use public-key cryptography to authenticate client 110 and/or to permit client 110 to authenticate a user. The SSH protocol may provide confidentiality and integrity to data exchanged between network device 130 and client 110 using encryption and message authentication codes (MACs). SFTP may include a network protocol that provides file transfer and manipulation functionality over any data stream. The DTCP standard was proposed by the DTLA (Digital Transmission Licensing Administrator) and may protect multimedia distribution. SCP may provide a mechanism for securely transferring documents between devices using the SSH protocol.

Although FIG. 1 shows exemplary components of network 100, in other implementations, network 100 may contain fewer, different, or additional components than depicted in FIG. 1. In still other implementations, one or more components of network 100 may perform the tasks performed by one or more other components of network 100.

Exemplary Network Device Configuration

Figure 2:
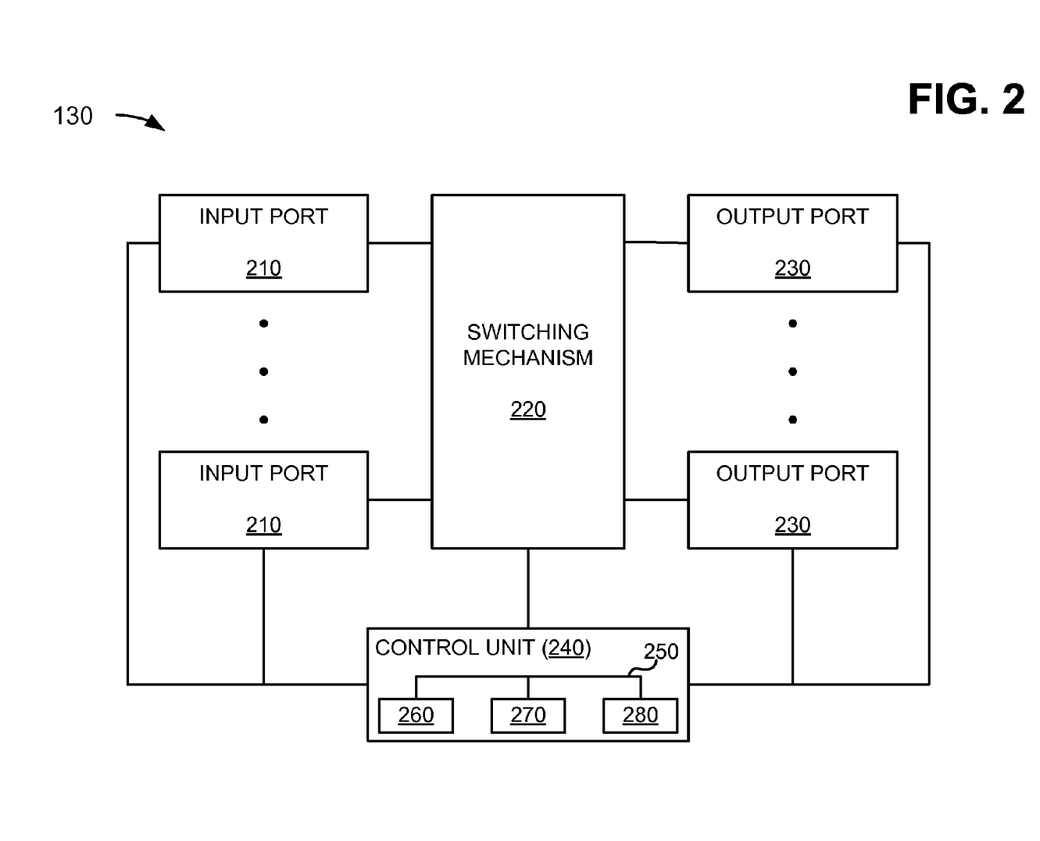
FIG. 2 is an exemplary diagram of a network device of the exemplary network depicted in FIG. 1.

FIG. 2 is an exemplary diagram of a device that may correspond to network device 130 of FIG. 1. The device may include input ports 210, a switching mechanism 220, output ports 230, and a control unit 240. Input ports 210 may be the points of attachments for physical links (not shown) and may be the points of entry for incoming service requests. Switching mechanism 220 may interconnect input ports 210 with output ports 230. Output ports 230 may store the service requests and may schedule the requests for service on one or more output links (not shown). Control unit 240 may participate in routing protocols and may create a forwarding table that is used in service forwarding.

Input ports 210 may carry out datalink layer encapsulation and decapsulation. Input ports 210 may look up a destination address of an incoming datagram (e.g., any type or form of data, such as packet or non-packet data) in a forwarding table to determine its destination port (i.e., route lookup). In order to provide QoS guarantees, input ports 210 may classify datagrams into predefined service classes. Input ports 210 may run datalink-level protocols or network-level protocols.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming datagrams may be stored in a shared memory and pointers to datagrams may be switched.

Output ports 230 may store datagrams before they are transmitted on an output link. Output ports 230 may include scheduling algorithms that support priorities and guarantees. Output ports 230 may support datalink layer encapsulation and decapsulation, and/or a variety of higher-level protocols.

Control unit 240 may interconnect with input ports 210, switching mechanism 220, and output ports 230. Control unit 240 may compute a forwarding table, implement routing protocols, and/or run software to configure and manage network device 130. Control unit 240 may handle any datagram whose destination address may not be found in the forwarding table.

In one implementation, control unit 240 may include a bus 250 that may include a path that permits communication among a processor 260, a memory 270, and a communication interface 280. Processor 260 may include a microprocessor or processing logic (e.g., an application specific integrated circuit (ASIC), field programmable gate array (FPGA), etc.) that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Control unit 240 (e.g., memory 270) may include one or more kernels as components of an operating system. A kernel may manage the components of network device 130, and may manage communication between hardware and software components of network device 130. The kernel may provide an abstraction layer for components of network device 130 (e.g., input ports 210, output ports 220, processor 260, and memory 270) that applications may control to perform a service or function. In one implementation, the kernel may provide one or more daemons to manage one or more components of network device 130, and/or provide services from network device 130.

A "daemon," as the term is used herein, is to be broadly interpreted to include any type of daemon capable of being utilized by network device 130. A daemon may include, for example, a process that handles any periodic service request that network device 130 may expect to receive, a process that forwards service requests to other processes performed by network device 130, a process that responds to service requests, hardware activity, or other processes by performing some task, etc. In one example, network device 130 may include a protocol daemon (e.g., an SSH daemon) capable of providing authentication and/or encryption, and a service daemon capable of providing services performable by network device 130.

Network device 130 may perform certain operations, as described in detail below. Network device 130 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 130, in other implementations, network device 130 may contain fewer, different, or additional components than depicted in FIG. 2. In still other implementations, one or more components of network device 130 may perform the tasks performed by one or more other components of network device 130.

Exemplary Network Device Operation

Figure 3:
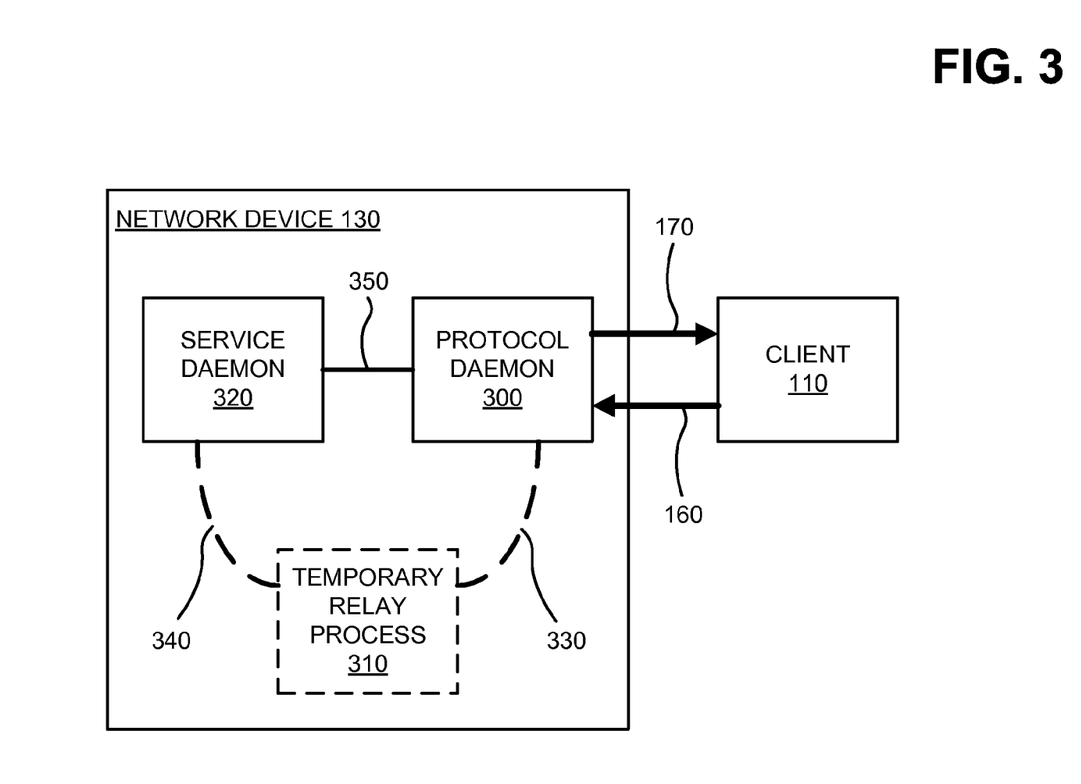
FIG. 3 is a diagram showing interactions between a client and a network device of the exemplary network depicted in FIG. 1.

FIG. 3 is a diagram showing interactions between client 110 and network device 130. As shown, network device 130 may include a protocol daemon 300, a temporary relay process 310, and a service daemon 320. In one implementation, protocol daemon 300, temporary relay process 310, and service daemon 320 may include processes performed in control unit 240 (e.g., within the kernel of control unit 240).

Protocol daemon 300 may include a daemon that performs protocol-related processes for network device 130. For example, protocol daemon 300 may be initiated upon receipt of service request 160 from client 110. In one implementation, protocol daemon 300 may be, for example, a SSH protocol daemon, and may identify the type of service desired by service request 160 based on a subsystem name provided by service request 160. Protocol daemon 300 may authenticate client 110 for access purposes to network device 130. For example, protocol daemon 300 may request password or username identification (or some other type of authentication parameters, such as public key, host-based, etc. authentications parameters) from client 110. If client 110 is not authenticated, protocol daemon 300 may deny client 110 access to network device 130. If client 110 is authenticated, protocol daemon 300 may generate a request to create service daemon 320 that provides the service desired by service request 160. Protocol daemon 300 may also generate a request to initiate temporary relay process 310 that provides authorization functions, as described below, and/or precludes modification of the open-source code of protocol daemon 300.

Protocol daemon 300 may use a file descriptor passing mechanism that provides a file descriptor or identification of endpoints for communication among processes (e.g., protocol daemon 300, temporary relay process 310, and service daemon 320) of network device 130. In one implementation, a file descriptor 330 may identify temporary relay process 310 as an endpoint for communication with protocol daemon 300 and may establish a temporary communication link between protocol daemon 300 and temporary relay process 310.

Temporary relay process 310 may include a temporary process that performs a check of service request 160. Temporary relay process 310 may determine whether client 110 (or a user of client 110) is authorized to access the service desired by service request 160. For example, temporary relay process 310 may determine whether a username (e.g., provided by the user of client 110) is authorized for the requested service. If client 110 (or user of client 110) is not authorized, temporary relay process 310 may deny client 110 access to the requested service. If client 110 (or user of client 110) is authorized, temporary relay process 310 may permit access to the service (e.g., service daemon 320) desired by service request 160, and may redirect file descriptor 330 to service daemon 320, as indicated by reference number 340. Redirected file descriptor 340 may cause the endpoint for communication with protocol daemon 300 to be at service daemon 320. Thus, service daemon 320 may directly communicate with protocol daemon 300, e.g., via a pipe or communication link 350. Temporary relay process 310 may cease operation after redirecting service request 160 to service daemon 320, which may conserve resources of network device 130.

Service daemon 320 may directly communicate with protocol daemon 300, via pipe 350, to provide the service desired by service request 160 to the requesting device (e.g., client 110). In one implementation, protocol daemon 300 may provide the requested service to client 110 in an encrypted format. With this arrangement, network device 130 may provide security for any type of requested service, and may provide scalability (e.g., new service types may be added). The arrangement may be utilized with a variety of network protocols (e.g., SSH), may be utilized with any type of daemon, may be implemented without altering the protocol daemon, and may prevent multiple copies of the same service daemon from being created. In on example, service daemon 320 may include a DTCP server or a Simple Network Management Protocol (SNMP) server.

Although FIG. 3 shows exemplary process-related components of network device 130, in other implementations, network device 130 may contain fewer, different, or additional process-related components than depicted in FIG. 3. In still other implementations, one or more process-related components of network device 130 may perform the tasks performed by one or more other process-related components of network device 130.

Exemplary Process

Figure 4:
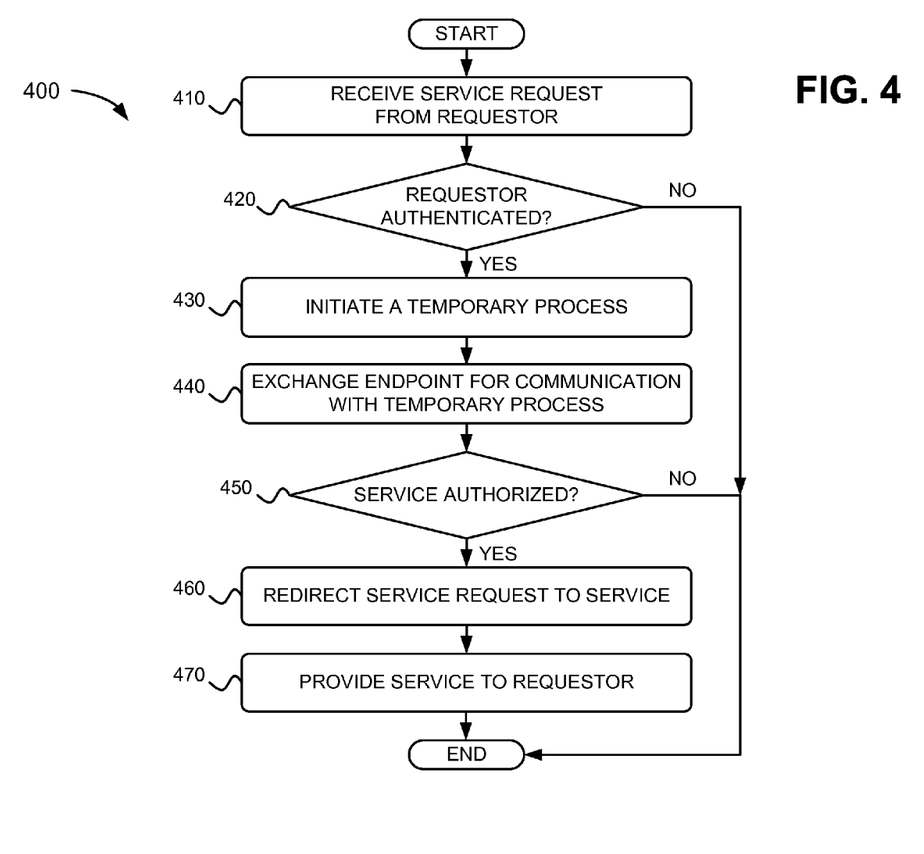
FIGS. 4 and 5 are flowcharts of an exemplary process according to an implementation described herein.
Figure 5:
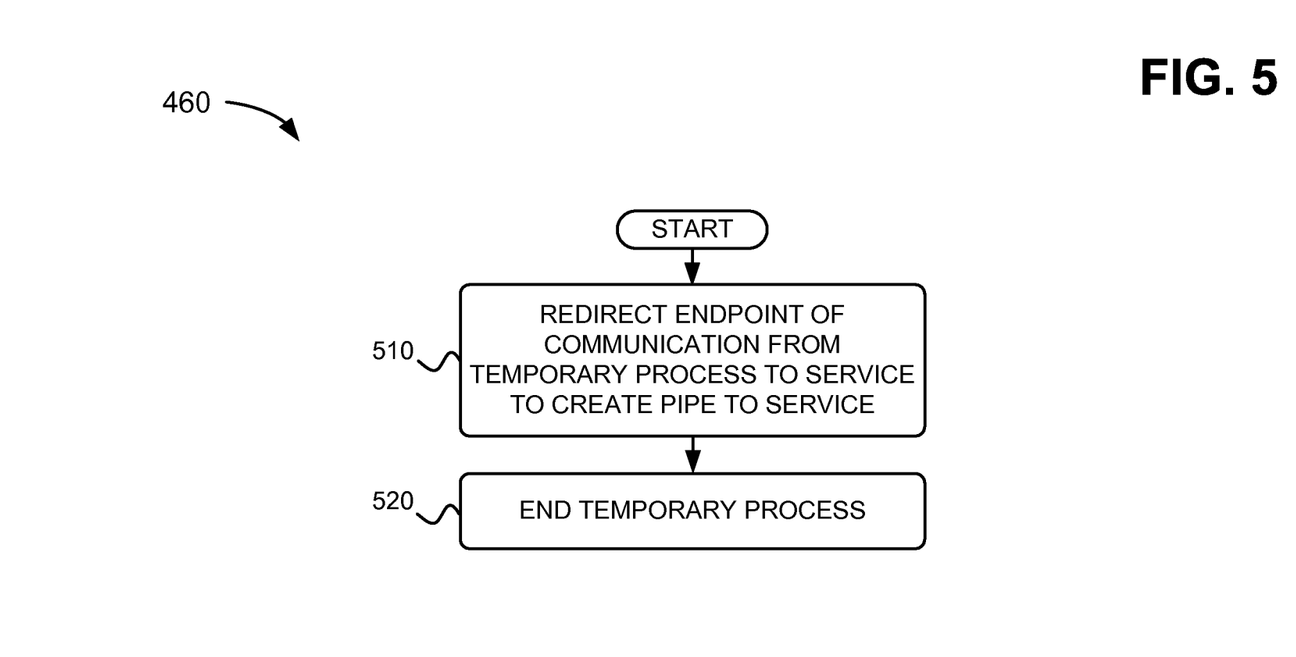

FIGS. 4 and 5 are flowcharts of an exemplary process 400 capable of being performed by network device 130. As shown in FIG. 4, process 400 may begin by receiving a request for performance of a service by a network device from a requestor (block 410). For example, in one implementation described above in connection with FIG. 3, protocol daemon 300 of network device 130 may be initiated or called upon receipt of service request 160 from client 110. Protocol daemon 300 may be, for example, a SSH protocol daemon. In one example, protocol daemon 300 may identify the type of service desired by service request 160 based on a subsystem name provided by service request 160.

Process 400 may determine whether the requestor (e.g., client 110) of the service request is authenticated (block 420). If the requestor is not authenticated (block 420—NO), process 400 may end. For example, in one implementation described above in connection with FIG. 3, protocol daemon 300 may authenticate client 110 for access purposes to network device 130. In one example, protocol daemon 300 may receive password or username identification from client 110. If client 110 is not authenticated, protocol daemon 300 may deny client 110 access to network device 130. In another example, protocol daemon 300 may not request authentication, but may provide encrypted communications with client 110.

As further shown in FIG. 4, if the requestor is authenticated (block 420—YES), a temporary process may be initiated (block 430) and endpoints for communication with a temporary process may be exchanged (block 440). For example, in one implementation described above in connection with FIG. 3, protocol daemon 300 may generate a request to initiate temporary relay process 310 that provides authorization functions and/or precludes modification of the open-source code of protocol daemon 300. Protocol daemon 300 may utilize a file descriptor passing mechanism that provides a file descriptor or identification of endpoints for communication among processes of network device 130. In one example, file descriptor 330 may identify temporary relay process 310 as an endpoint for communication with protocol daemon 300 and may establish a temporary communication link between protocol daemon 300 and temporary relay process 310.

The temporary process may determine whether the requestor is authorized for performance of the requested service (block 450). If the requestor is not authorized for the requested service (block 450—NO), process 400 may end. For example, in one implementation described above in connection with FIG. 3, temporary relay process 310 may determine whether client 110 (or a user of client 110) is authorized to access the service desired by service request 160. In one example, temporary relay process 310 may determine whether a username (e.g., provided by the user of client 110) is authorized for the requested service. If client 110 (or user of client 110) is not authorized, temporary relay process 310 may deny client 110 access to the requested service.

If the requestor is authorized for the requested service (block 450—YES), the temporary process may redirect the service request to a service (block 460). For example, in one implementation described above in connection with FIG. 3, if client 110 (or user of client 110) is authorized, temporary relay process 310 may redirect file descriptor 330 to service daemon 320, as indicated by reference number 340. Redirected file descriptor 340 may cause the endpoint for communication with protocol daemon 300 to be at service daemon 320. Thus, service daemon 320 may directly communicate with protocol daemon 300, e.g., via pipe 350.

As further shown in FIG. 4, the network device may provide the requested service to the requestor (block 470). For example, in one implementation described above in connection with FIG. 3, service daemon 320 may directly communicate with protocol daemon 300, via pipe 350, to provide the service desired by service request 160 to the requesting device (e.g., client 110). In one example, protocol daemon 300 may provide the requested service to client 110 in an encrypted format.

FIG. 5 shows an exemplary implementation of process blocks related to process block 460 (i.e., redirection of the service request to the service). As shown, the endpoint for communication to the temporary process may be redirected to create a communication pipe to the requested service (block 510). For example, in one implementation described above in connection with FIG. 3, temporary relay process 310 may redirect file descriptor 330 to service daemon 320, as indicated by reference number 340. Redirected file descriptor 340 may cause the endpoint for communication with protocol daemon 300 to be at service daemon 320. Thus, service daemon 320 may directly communicate with protocol daemon 300, e.g., via pipe 350.

As further shown in FIG. 5, the temporary process may cease operation (block 520). For example, in one implementation described above in connection with FIG. 3, temporary relay process 310 may cease operation after redirecting service request 160 to service daemon 320, which may conserve resources of network device 130.

CONCLUSION

Systems and methods described herein may provide a mechanism that prevents multiple copies of a service from being created by a network device. For example, in one implementation, a protocol daemon of the network device may receive a service request and may authenticate a requestor of the service. If the service requestor is authenticated, a temporary relay process of the network device may be initiated, and may redirect the service request from the protocol daemon to a service daemon if the service is authorized. The temporary relay process may cease operation after redirecting the service request, which may conserve network device resources. The service daemon may provide the requested service to the requestor. Systems and methods described herein may provide security for any service requested from a network device, may be applied to a variety of network protocols, may be applied to any network device daemon, and may be scalable. Furthermore, the systems and methods may be implemented without altering the open-source code of the protocol daemon.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 4 and 5, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments described above is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a network device, the method comprising:
   receiving, by a secure shell (SSH) protocol daemon executed by the network device, a request from a requestor for a service performed by the network device;
   initiating the SSH protocol daemon of the network device upon receipt of the service request;
   utilizing a temporary process, implemented using hardware and executed by the network device, to determine whether the requestor is authorized for the service;
   denying, by the temporary process, the service request when the requestor is not authorized;
   redirecting, by the temporary process, the service request to a service daemon when the requestor is authorized, the redirecting the service request including:
      redirecting a first endpoint of communication indicating the temporary process as the endpoint for communication with the SSH protocol daemon to a second endpoint of communication indicating the service daemon as the endpoint for communication with the SSH protocol daemon;
      creating a communication link between the SSH protocol daemon and the service daemon based on the second endpoint; and
      providing the service to the requestor, using the communication link, when the requestor is authorized.

2. The method of claim 1, where establishing an encrypted session with the requestor comprises:
   instructing the SSH protocol daemon to request one of a password or a username from the requestor; and
   determining whether the requestor is authenticated based on the received password or username.

3. The method of claim 1, further comprising:
   exchanging information indicating the temporary process as the endpoint for communication with the SSH protocol daemon prior to redirecting the service request.

4. The method of claim 3, further comprising:
   creating a temporary communication link between the SSH protocol daemon and the temporary process.

5. The method of claim 1, where redirecting the service request to the service daemon further comprises:
   ceasing operation of the temporary process.

6. The method of claim 1, where utilizing the temporary process to determine whether the requestor is authorized for the service comprises:
   receiving authentication parameters from the requestor; and
   determining whether the requestor is authorized for the service based on the received authentication parameters.

7. The method of claim 1, where providing the service to the requestor comprises:
   providing the service to the requestor in an encrypted format.

8. A network device comprising:
   processing logic to:
      receive, by a secure shell (SSH) protocol daemon executed by the network device, a request from a requestor for a service performed by the network device,
      establish an encrypted session with the requestor,
      utilize a temporary process, implemented using hardware and executed by the network device, to determine whether the requestor is authorized for the service,
      redirect the service request to a service daemon when the requestor is authorized,
      provide, by the service daemon, the service to the requestor when the requestor is authorized, and
      deny, by the temporary process, the service request when the requestor is not authorized.

9. The network device of claim 8, where the processing logic is further configured to:
   initiate the SSH protocol daemon upon receipt of the service request.

10. The network device of claim 9, where the processing logic is further configured to:
    instruct the SSH protocol daemon to request one of a password or a username from the requestor; and
    determine whether the requestor is authenticated based on the received password or username.

11. The network device of claim 9, where the processing logic is further configured to:
    exchange a file descriptor indicating the temporary process as an endpoint for communication with the SSH protocol daemon.

12. The network device of claim 11, where the processing logic is further configured to:
    create a temporary communication link between the SSH protocol daemon and the temporary process based on the file descriptor.

13. The network device of claim 9, where the processing logic is further configured to:
    redirect a first file descriptor indicating the temporary process as the endpoint for communication with the SSH protocol daemon to a second file descriptor indicating the service daemon as the endpoint for communication with the SSH protocol daemon; and
    create a communication link between the SSH protocol daemon and the service daemon based on the second file descriptor.

14. The network device of claim 13, where the processing logic is further configured to:
    cease operation of the temporary process after the service request is redirected to the service daemon.

15. The network device of claim 8, where the processing logic is further configured to:
    receive a username from the requestor; and
    determine whether the requestor is authorized for the service based on the received username.

16. The network device of claim 8, where, when providing the service, the processing logic is further configured to:
provide the service to the requestor in an encrypted format.

17. A network device comprising:
a memory storing instructions; and
a processor executing the instructions to:
receive a request from a requestor for a service daemon performed by the network device, and
initiate a secure shell (SSH) protocol daemon, executed by the network device and based on receipt of the service daemon request, that:
establishes an encrypted session with the requestor,
initiates a temporary process, implemented using hardware and executed by the network device, that determines whether the requestor is authorized for the service daemon, and redirects the service request to the service daemon when the requestor is authorized, and
provides the service daemon to the requestor when the requestor is authorized.

18. The network device of claim 17, where the network device comprises one of:
a gateway;
a router;
a switch;
a firewall;
a bridge;
a proxy server;
a device providing an instant virtual extranet (IVE); or
a device providing a secure sockets layer (SSL) virtual private network (VPN).

19. The network device of claim 17, where the processor prevents duplication of the service daemon.

20. The network device of claim 17, where the processor prevents modification of the SSH protocol daemon.

\* \* \* \* \*